United States Patent
Whipple et al.

(10) Patent No.: US 10,738,683 B2
(45) Date of Patent: *Aug. 11, 2020

(54) INTERCOOLER LID ASSEMBLY AND METHOD OF INSTALLATION

(71) Applicant: Whipple Industries, Inc., Fresno, CA (US)

(72) Inventors: Dustin E. Whipple, Fresno, CA (US); Yehoram Hofman, Newport Coast, CA (US); Garrett Wayne Bright, Clovis, CA (US)

(73) Assignee: Whipple Industries, Inc., Fresno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/155,753

(22) Filed: Oct. 9, 2018

(65) Prior Publication Data

US 2019/0331022 A1 Oct. 31, 2019

Related U.S. Application Data

(60) Provisional application No. 62/663,409, filed on Apr. 27, 2018.

(51) Int. Cl.
*F02B 29/04* (2006.01)
*F02B 37/04* (2006.01)

(52) U.S. Cl.
CPC ...... *F02B 29/0462* (2013.01); *F02B 29/0475* (2013.01); *F02B 37/04* (2013.01)

(58) Field of Classification Search
CPC .............. F02B 29/0412; F02B 29/0462; F02B 29/0475; F02B 33/40; F02B 37/04
See application file for complete search history.

(56) References Cited

U.S. PATENT DOCUMENTS

| 6,029,637 | A | 2/2000 | Prior |
| 6,129,056 | A * | 10/2000 | Skeel ........................ F01P 3/18 123/41.49 |
| 6,227,179 | B1 | 5/2001 | Eiermann et al. |
| 9,664,152 | B2 | 5/2017 | Zoner et al. |
| 9,683,481 | B1 | 6/2017 | Magana et al. |
| 9,890,692 | B1 | 2/2018 | Turnage |
| 2007/0107704 | A1 | 5/2007 | Billings et al. |
| 2010/0258096 | A1* | 10/2010 | Frank .................. F02B 29/0443 123/563 |
| 2017/0218891 | A1 | 8/2017 | Zoner et al. |
| 2017/0350310 | A1 | 12/2017 | Magana et al. |

FOREIGN PATENT DOCUMENTS

JP    2007309172 A    11/2007

OTHER PUBLICATIONS

International Search Report and Written Opinion in corresponding application PCT/US2019/027973 dated Aug. 5, 2019 (11 pages).

* cited by examiner

*Primary Examiner* — Brandon D Lee
(74) *Attorney, Agent, or Firm* — Procopio Cory Hargreaves and Savitch LLP (57) ABSTRACT

An intercooler lid assembly for an intercooler supercharger system, comprising: an intercooler lid mountable to a supercharger housing; a plurality of intercooler cores coupled together, and mounted to and within the intercooler lid to cool supercharger air prior to receipt by an engine, wherein the intercooler lid assembly is pre-assembled and mounted onto the supercharger housing to install the intercooler lid assembly.

4 Claims, 8 Drawing Sheets

INTERCOOLER LID ASSEMBLY AND METHOD OF INSTALLATION

FIELD OF THE INVENTION

The present invention is related to intercooler supercharger systems and methods.

BACKGROUND OF THE INVENTION

Intercooler supercharger systems have been developed in the past to obtain additional power from an engine. A supercharger delivers additional air so that a vehicle engine can burn additional fuel. The additional air is provided by compressing the air with the supercharger before it enters the engine. When the air is compressed, however, the temperature of the air rises. Higher-temperature air is less dense and more volatile. An intercooler has been used between the supercharger and the engine to cool the compressed air to the desired temperature before injecting it into the engine.

Intercooler cores in the past have been mounted to the supercharger housing, with the housing lid going on top of the intercooler core(s). These designs have required two castings, one per side to bolt to a cylinder head. In one of these designs the supercharger housing bolts to these castings. A housing lid is then added. In another design including a monolithic housing with the lid casted into the housing, a "sliding" portion of the intercooler is required. From an OEM standpoint, neither of these designs could be used by an original equipment manufacturer ("OEM"). As a result, these designs are after-market products.

SUMMARY OF THE INVENTION

An aspect of the invention involves an intercooler lid assembly for a housing of an intercooler supercharger system comprising three single-pass intercooler cores mounted in the lid. With lid and intercooler as one piece and providing access to bolts from the top, the intercooler lid assembly can be used by an OEM wanting to provide an intercooler supercharger system in its manufactured vehicle.

Another aspect of the invention involves an intercooler lid assembly for an intercooler supercharger system, comprising: an intercooler lid mountable to a supercharger housing; a plurality of intercooler cores coupled together, and mounted to and within the intercooler lid to cool supercharger air prior to receipt by an engine, wherein the intercooler lid assembly is pre-assembled and mounted onto the supercharger housing to install the intercooler lid assembly.

One or more implementations of the aspect described immediately above include one or more of the following: the plurality of intercooler cores include a plurality of heat exchange medium inlets and outlets coupled together within the intercooler lid to allow heat exchange fluid to transfer there through to cool the plurality of intercooler cores; the plurality of heat exchange medium inlets and outlets coupled together within the intercooler lid; the plurality of intercooler cores include a plurality of connection flanges to couple the plurality of intercooler cores together within the intercooler lid; the plurality of intercooler cores include a plurality of connection flanges to couple the plurality of intercooler cores within and to the intercooler lid; the plurality of intercooler cores include a central intercooler core with opposite sides and a pair of side intercooler cores disposed along the opposite sides of the central intercooler core.

A still further aspect of the invention involves a method of installing the intercooler lid assembly of the aspect described immediately above, comprising pre-assembling the plurality of intercooler cores within the intercooler lid and coupling the plurality of intercooler cores together and to the intercooler lid within the intercooler lid; mounting the intercooler lid assembly onto the supercharger housing to install the intercooler lid assembly.

One or more implementations of the aspect described immediately above include one or more of the following: the plurality of intercooler cores include a plurality of heat exchange medium inlets and outlets, and coupling includes coupling the plurality of heat exchange medium inlets and outlets together within the intercooler lid to allow heat exchange fluid to transfer there through to cool the plurality of intercooler cores; coupling the plurality of heat exchange medium inlets and outlets together; the plurality of intercooler cores include a plurality of connection flanges to couple the plurality of intercooler cores together within the intercooler lid, and coupling includes coupling the plurality of intercooler cores together with the connection flanges and fasteners; the plurality of intercooler cores include a plurality of connection flanges to couple the plurality of intercooler cores within and to the intercooler lid, and coupling includes coupling the plurality of intercooler cores within and to the intercooler lid with the connection flanges and fasteners; and/or the plurality of intercooler cores include a central intercooler core with opposite sides and a pair of side intercooler cores, and pre-assembling includes positioning the pair of side intercooler cores along the opposite sides of the central intercooler core.

DETAILED DESCRIPTION OF THE INVENTION

With reference to FIGS. 1-4F, an embodiment of an intercooler lid assembly 100 for an intercooler supercharger system 120 will be described after first describing the intercooler supercharger system 120.

The intercooler supercharger system 120 includes a housing 130 that encloses and directs air from a supercharger chamber 140 of a supercharger 145 to an intercooler assembly 150 and out the runners 160 to the engine (not shown).

The supercharger chamber 140 houses a rotor assembly 170. The supercharger 145 compresses the air to the engine by controlling a rate differential from the air intake through the rotor assembly 170 to air exhaust to the engine. In alternative embodiments, other compressor devices and configurations may be used such as, but not limited to, a screw compressor.

Figure 4A:
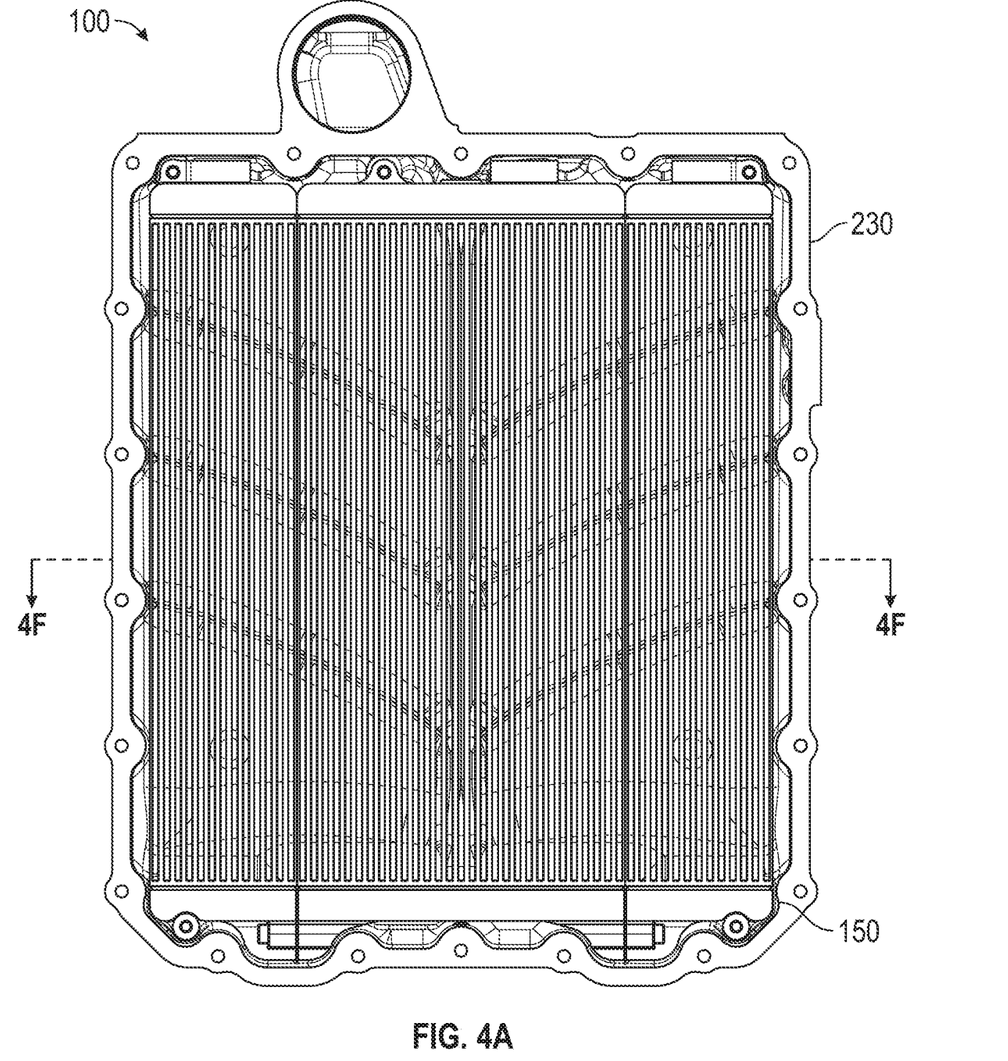
FIG. 4A is a top plan view of the intercooler lid assembly of FIG. 3A.
Figure 4B:
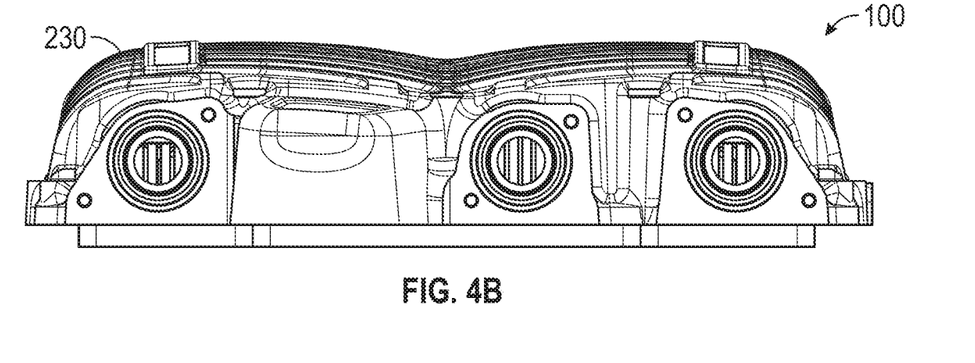
FIG. 4B is a front elevational view of the intercooler lid assembly of FIG. 4A.
Figure 4C:
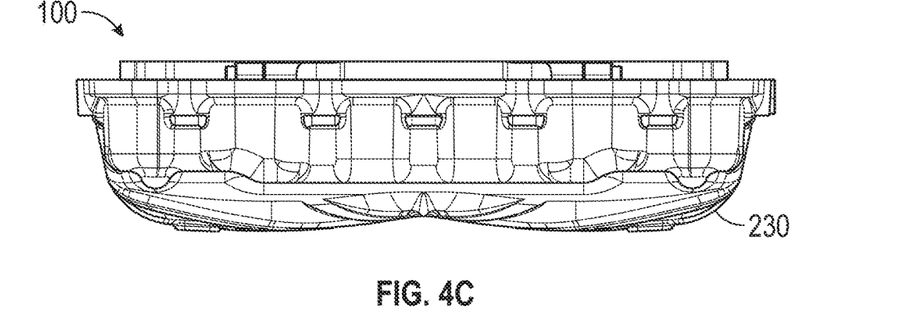
FIG. 4C is a rear elevational view of the intercooler lid assembly of FIG. 4A.
Figure 4D:
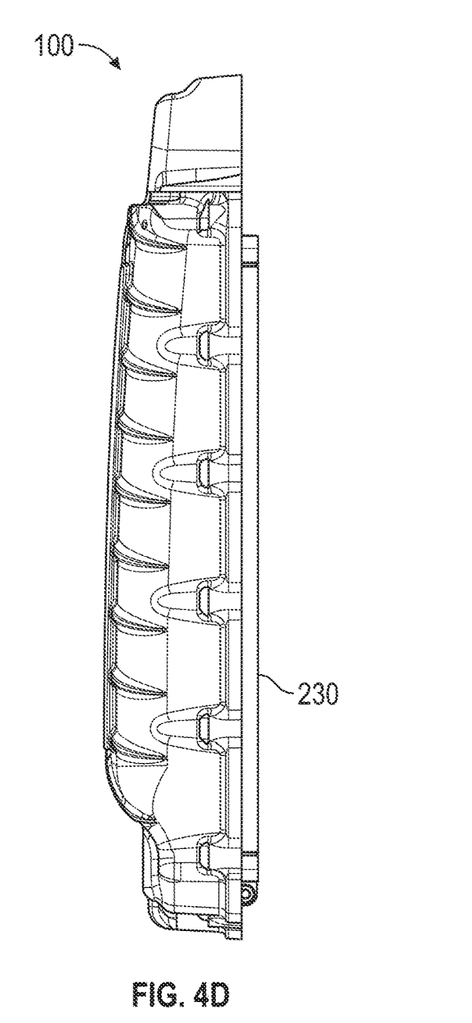
FIG. 4D is a left side elevational view of the intercooler lid assembly of FIG. 4A.
Figure 4E:
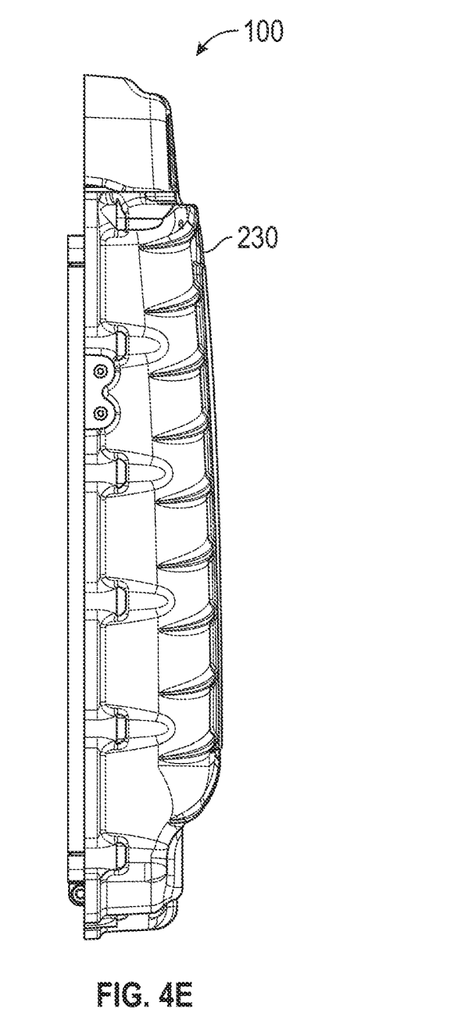
FIG. 4E is a right side elevational view of the intercooler lid assembly of FIG. 4A.
Figure 4F:
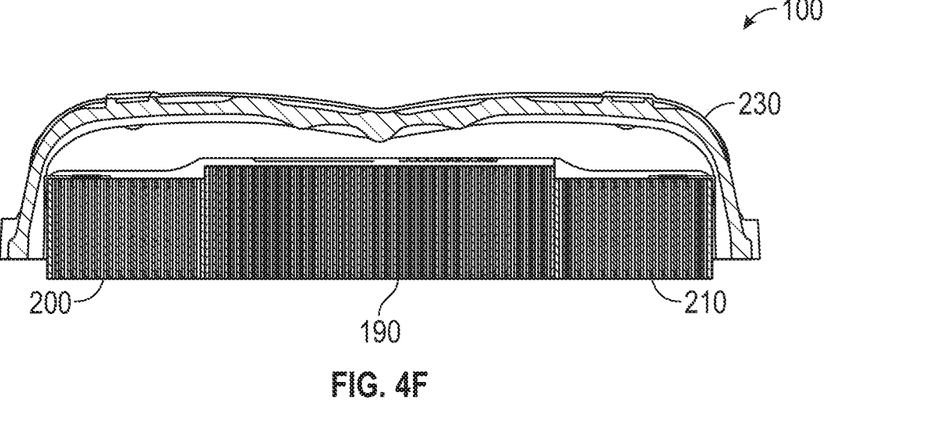
FIG. 4F is a cross-sectional elevational view of the intercooler lid assembly of FIG. 4A taken along lines 4F-4F.

As shown by the arrows, the air leaving the supercharger 145 enters a central chamber 180 and is directed through the intercooler assembly 150. The intercooler assembly 150 includes a plurality of separate intercooler cores 190, 200, 210. The supercharger air traverses the central intercooler core 190 and enters lid chamber 220, which is disposed between the intercooler assembly 150 and a lid 230. Together, the plurality of intercooler cores 190, 200, 210 and the lid 230 form the intercooler lid assembly 100. Air entering the lid chamber 220 is directed by a central rib 240 and side ribs 250, 260 (along with a curved interior surface of the lid 230) to and through the side intercooler cores 200, 210. Then, the cooled air travels along the runners 160 to the engine.

Figure 1:
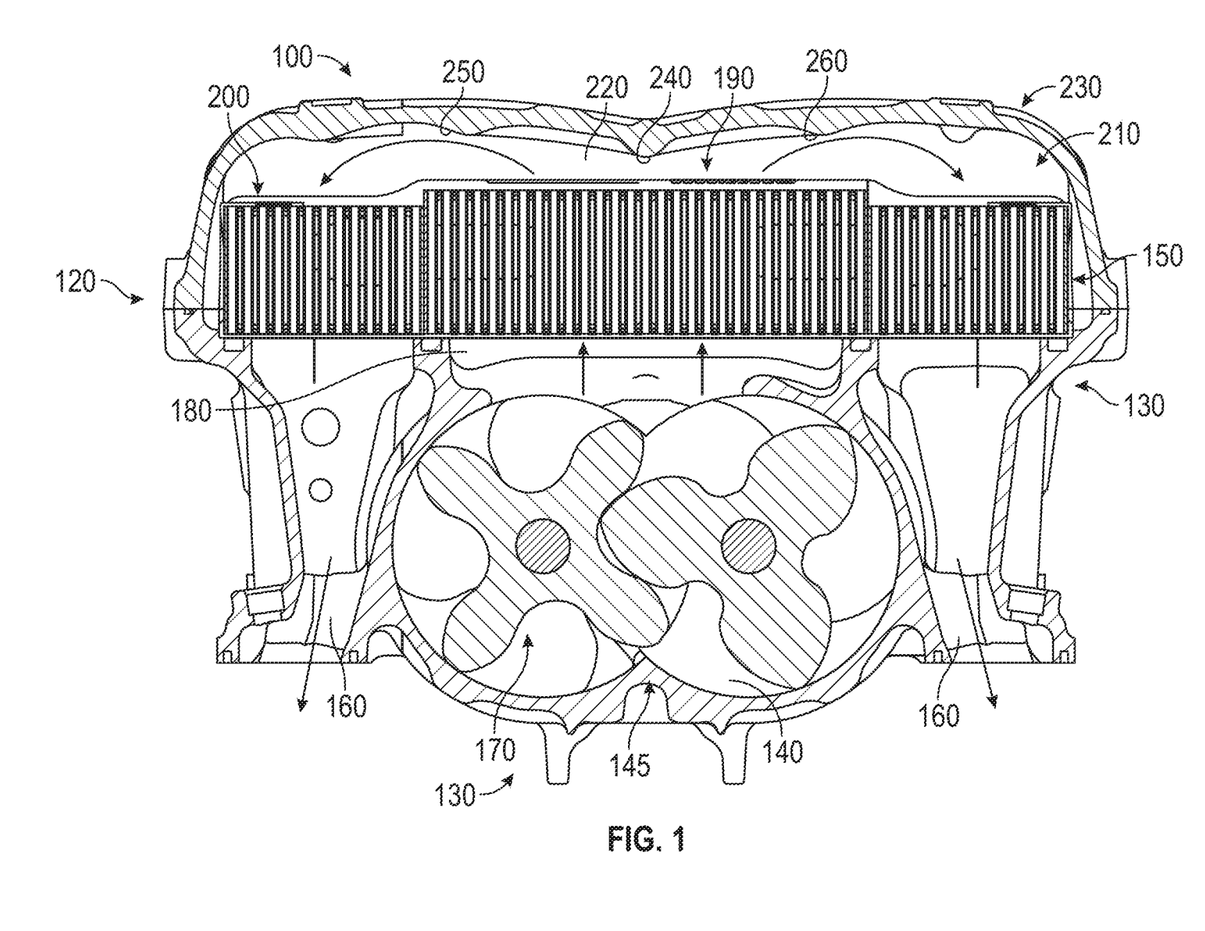
FIG. 1 is a perspective view of an embodiment of an intercooler lid assembly for a housing of an intercooler supercharger system.
Figure 2A:
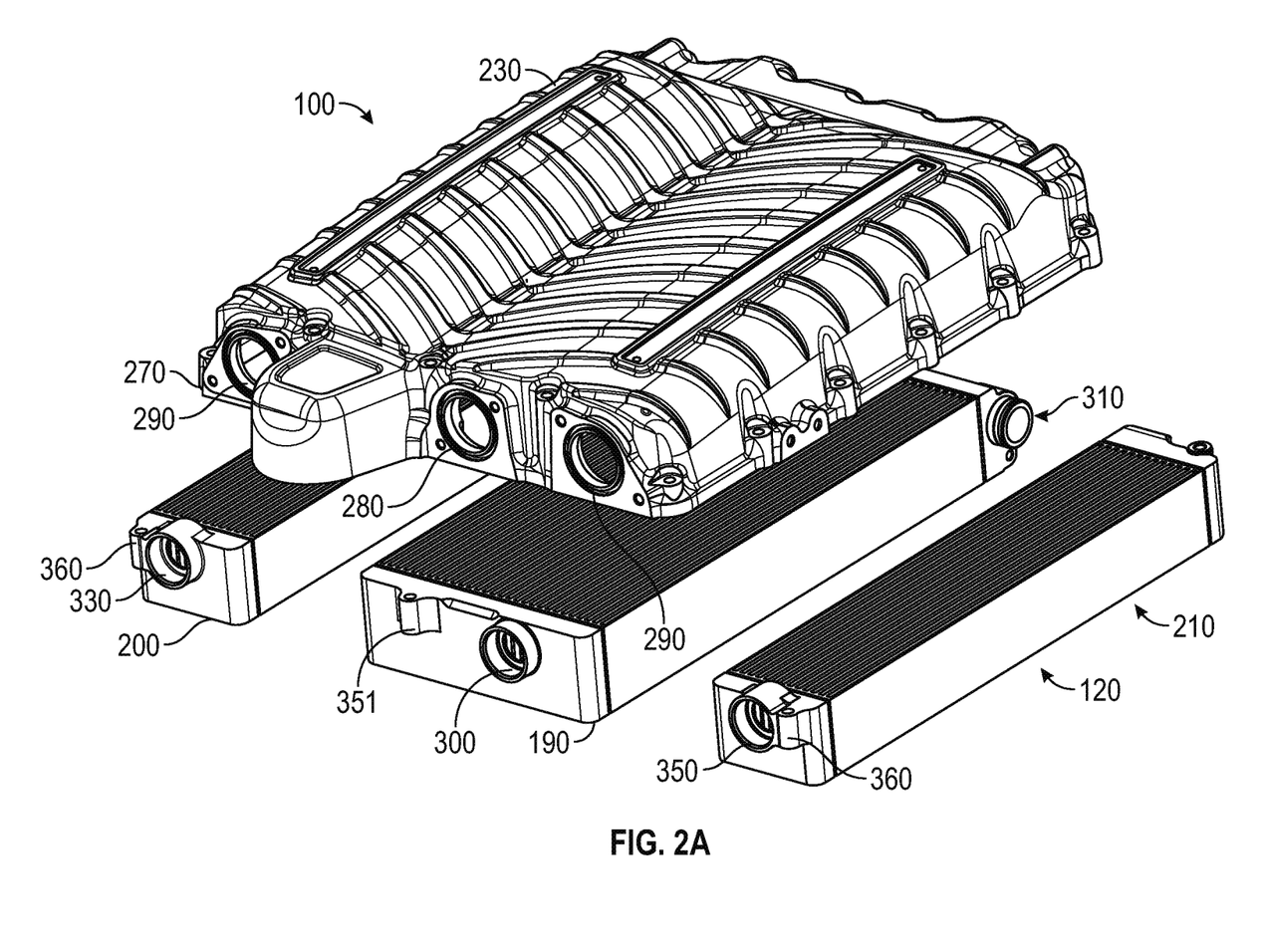
FIG. 2A is top perspective view of the intercooler lid assembly of FIG. 1.
Figure 2B:
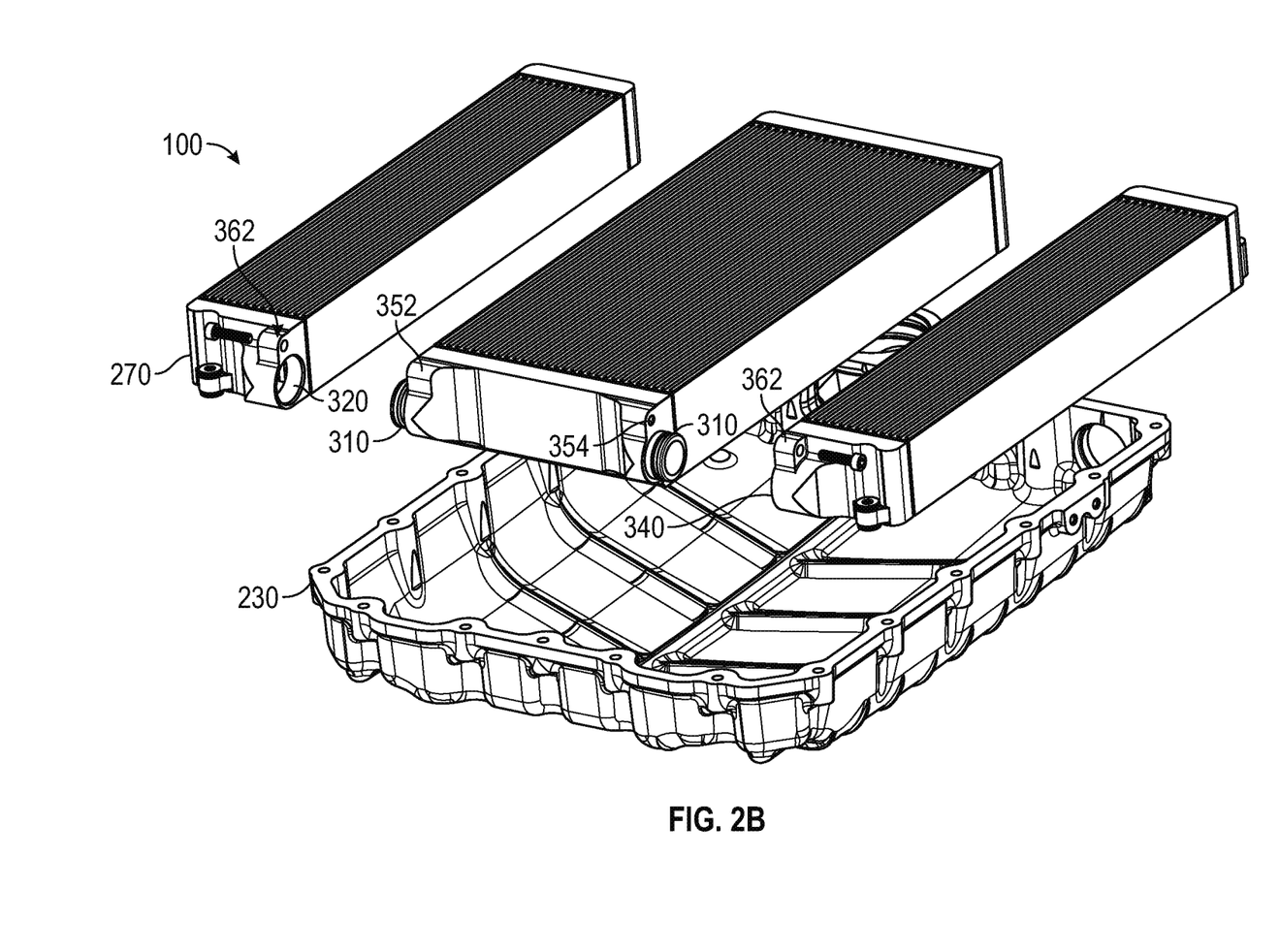
FIG. 2B is bottom perspective view of the intercooler lid assembly of FIG. 1.
Figure 3A:
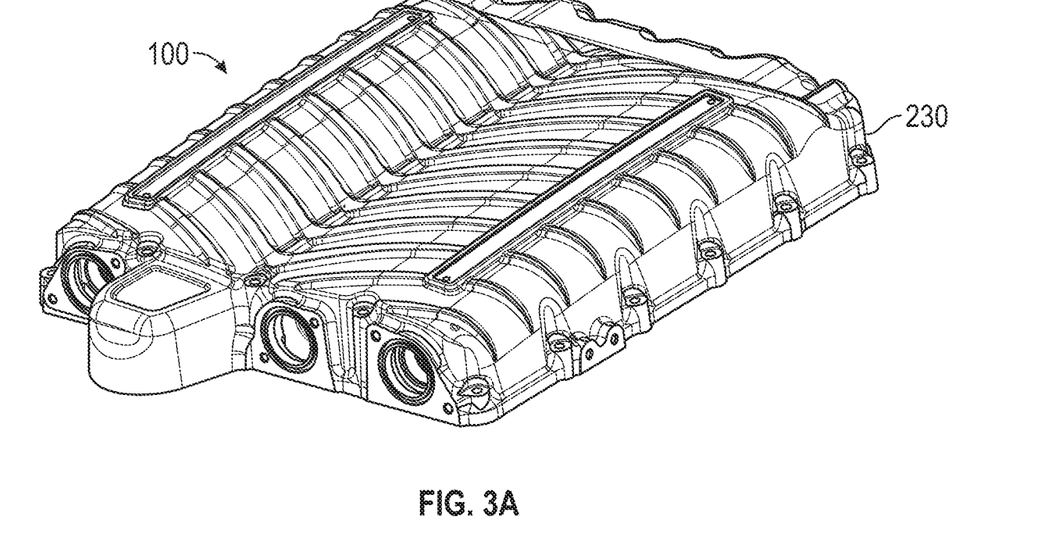
FIG. 3A is top perspective view of the intercooler lid assembly of FIG. 1 with a plurality of separate intercooler cores shown mounted within and to the lid.
Figure 3B:
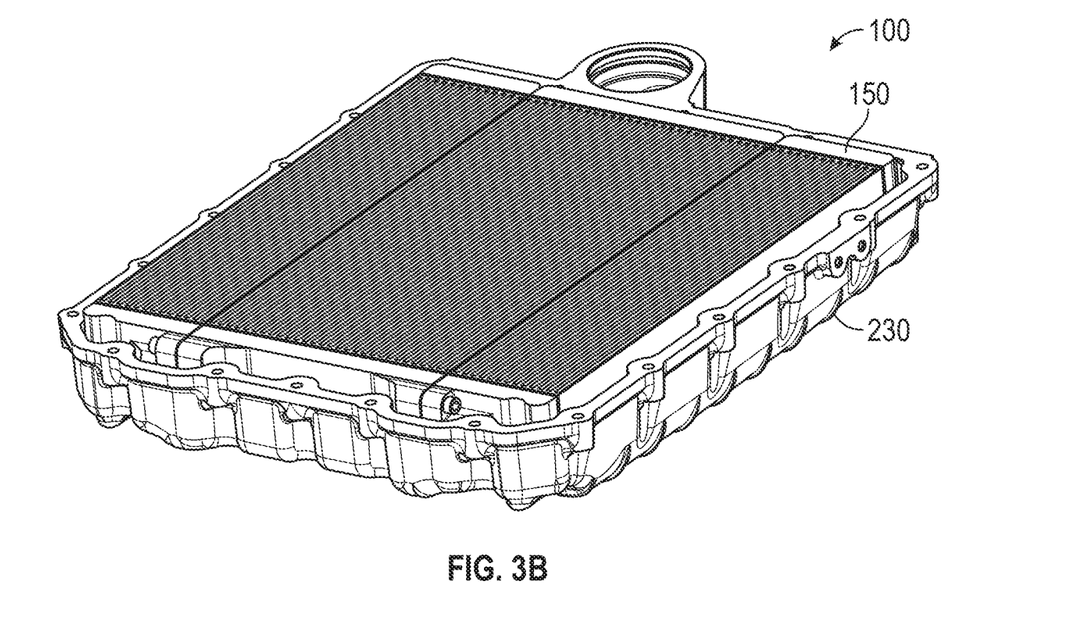
FIG. 3B is a bottom perspective view of the intercooler lid assembly of FIG. 3A.

With reference to FIGS. 2A and 2B, the intercooler lid assembly 100 includes a heat exchange medium system 270 for transferring a heat exchange medium (e.g., water) there through for cooling the compressed air that passes through the intercooler assembly 150. The heat exchange medium system 270 includes a lid heat exchange medium inlet 280 and lid heat exchange medium outlets 290. The central intercooler core 190 includes a heat exchange medium inlet 300 coupled with the lid heat exchange medium inlet 280, and heat exchange medium outlets 310 in communication with the inlet 300 through a fluid path (not shown). The side intercooler core 200 includes a heat exchange medium inlet 320 coupled with one of the heat exchange medium outlets 310, and a heat exchange medium outlet 330 in communication with the inlet 320 through a fluid path (not shown) and coupled with one of the lid heat exchange medium outlets 290. The side intercooler core 210 includes a heat exchange medium inlet 340 coupled with one of the heat exchange medium outlets 310, and a heat exchange medium outlet 350 in communication with the inlet 340 through a fluid path (not shown) and coupled with one of the lid heat exchange medium outlets 290. In the embodiment shown, the heat exchange medium outlets 310 and the heat exchange medium inlets 320, 340 are coupled together with dog-bone type joints. In alternative embodiments, the heat exchange medium outlets 310 and the heat exchange medium inlets 320, 340 are coupled together with radial o-ring seal(s), o-ring face seal(s), gasketed face seal(s), or other connectors/seals.

The central intercooler core 190 includes connection flanges 351, 352, 354 and the side intercooler cores 200, 210 include connection flanges 360, 362. Fasteners (e.g., bolts) are used to mount the central intercooler core 190 and the side intercooler cores 200, 210 to each other, and to and within the lid 230 through the connection flange 351 and the connection flanges 270, 360. FIGS. 3A through 4C show the central intercooler core 190 and the side intercooler cores 200, 210 mounted to and within the lid 230 to form the intercooler lid assembly 100.

In use, the intercooler lid assembly 100 is pre-assembled with the central intercooler core 190 and the side intercooler cores 200, 210 coupled together and mounted to and within the lid 230 to form the intercooler lid assembly 100 in the manner described with respect to FIGS. 2A and 2B. During installation, a user simply mounts/installs the intercooler lid assembly 100 to install the intercooler assembly.

Figure 5:
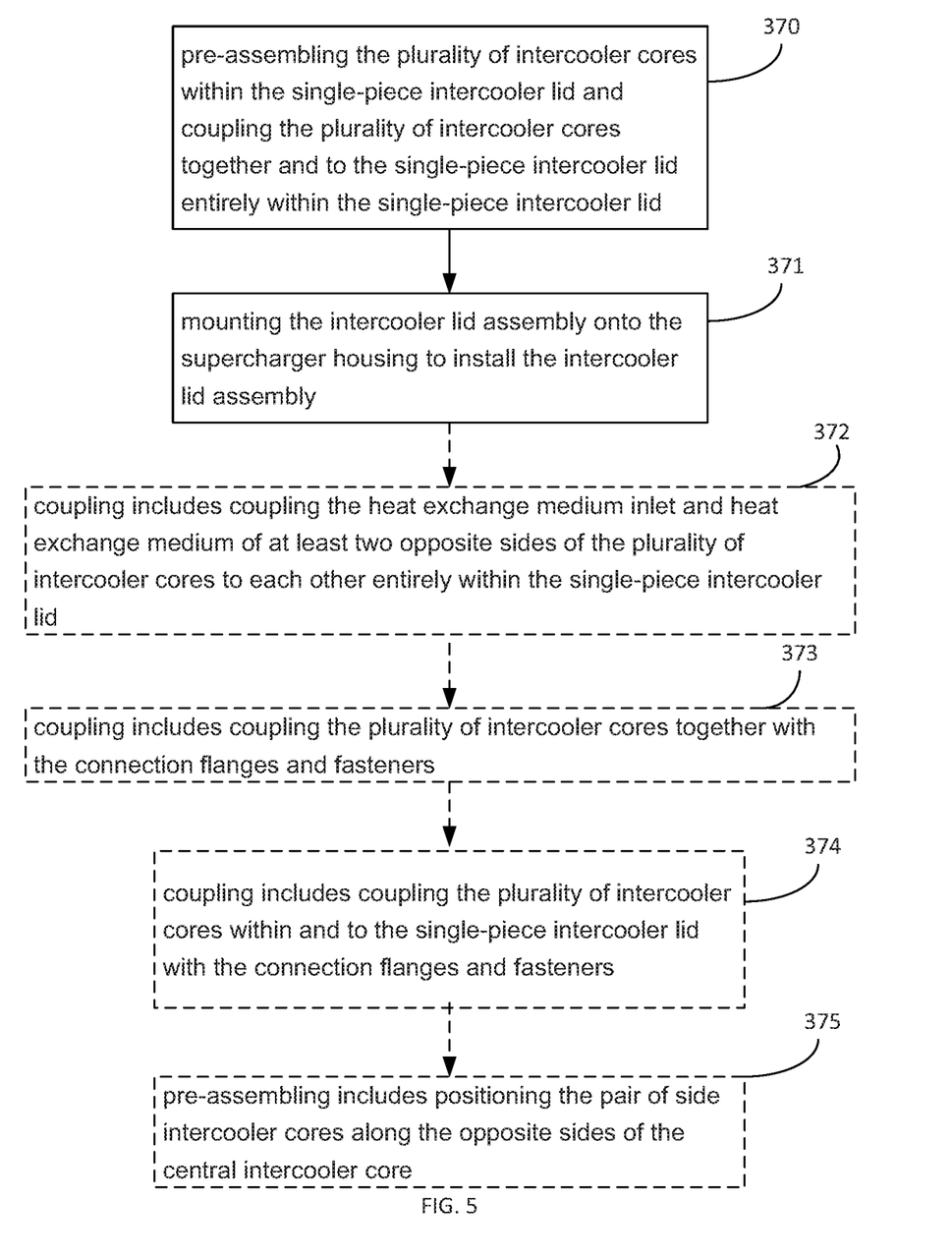
FIG. 5 is a flow chart of an exemplary method of installing an intercooler lid assembly.

With reference to FIG. 5, a more detailed method of installing an intercooler lid assembly comprises, at step 370, pre-assembling the plurality of intercooler cores within the single-piece intercooler lid and coupling the plurality of intercooler cores together and to the single-piece intercooler lid entirely within the single-piece intercooler lid; at step 371, mounting the intercooler lid assembly onto the supercharger housing to install the intercooler lid assembly; at optional step 372, coupling includes coupling the heat exchange medium inlet and heat exchange medium of at least two opposite sides of the plurality of intercooler cores to each other entirely within the single-piece intercooler lid; at optional step 373, coupling includes coupling the plurality of intercooler cores together with the connection flanges and fasteners; at optional step 374, coupling includes coupling the plurality of intercooler cores within and to the single-piece intercooler lid with the connection flanges and fasteners; at optional step 375, pre-assembling includes positioning the pair of side intercooler cores along the opposite sides of the central intercooler core.

Advantages of the intercooler lid assembly 100 include, among other advantages:

1. End user does not need to install the intercooler assembly, which is such a critical piece of the intercooler supercharger system, during installation. The intercooler assembly 150 is pre-assembled in the lid 230 and customer simply installs the lid 230 onto the housing 130 to install the intercooler assembly. Prior designs and intercooler assembly installations were much more time-consuming and complicated.
2. Simple water distribution amongst cores. Prior designs required external water lines to transfer water from core to core. In the intercooler lid assembly 100, the heat exchange medium connections are built in, attaching with a dog bone type joint(s), radial o-ring seal(s), o-ring face seal(s), gasketed face seal(s), or other connectors/seals.
3. Easy to change in packaging; core depth can be varied significantly easier.
4. Better flowing intake runners than prior designs, which is limited in runner shape, hurting efficiency.
5. Easy access to cores. One can simply remove the lid 230 and service/inspect cores 190, 200, 210. Prior designs required one to remove the entire supercharger assembly.
6. Packaging advantage, by being on top vs on side, the intercooler lid assembly 100 maximizes surface area of the intercooler vs a wide supercharger (cores on the side), which limits the ability to fit port injection into the lower portion of the manifold and, in some cases, cannot fit on the engine due to the width.
7. Increased airflow capacity. The runner section is the smallest area. Putting a core in this area limits airflow capacity through the intercooler core. By being on top of the runners, the intercooler lid assembly 100 provides room to increase surface area, lowering pressure loss.

While various embodiments of the present invention have been described above, it should be understood that they have been presented by way of example only, and not of limitation. Likewise, the various diagrams may depict an example architectural or other configuration for the disclosure, which is done to aid in understanding the features and functionality that can be included in the disclosure. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

As will become apparent to one of ordinary skill in the art after reading this document, the illustrated embodiments and their various alternatives can be implemented without confinement to the illustrated examples.

The invention claimed is:

1. An intercooler lid assembly for an intercooler supercharger system, comprising:
    a single-piece intercooler lid mountable to a supercharger housing;
    a plurality of intercooler cores coupled together, and mounted to and entirely within the single-piece intercooler lid to cool supercharger air prior to receipt by an engine,
    wherein the intercooler lid assembly is pre-assembled and mounted onto the supercharger housing to install the intercooler lid assembly,
    wherein the plurality of intercooler cores are configured to allow flow of air over the plurality of intercooler cores in opposite directions, and wherein the plurality of intercooler cores include a central intercooler core having a heat exchange medium inlet located opposite end of a two heat exchange medium outlets and pair of side intercooler cores disposed along the opposite sides of the central intercooler core and each of the side intercooler cores having heat exchange medium inlets coupled to the two heat exchange medium outlets of the central intercooler core and each of the side intercooler cores having heat exchange medium outlet located at the same end as the heat exchange medium inlet of the central intercooler core.

2. The intercooler lid assembly of claim 1, wherein the plurality of intercooler cores include a plurality of connection flanges to couple the plurality of intercooler cores together within the single-piece intercooler lid.

3. A method of installing the intercooler lid assembly of claim 1, comprising:
    pre-assembling the plurality of intercooler cores within the single-piece intercooler lid and coupling the plurality of intercooler cores together and to the single-piece intercooler lid entirely within the single-piece intercooler lid;
    mounting the intercooler lid assembly onto the supercharger housing to install the intercooler lid assembly.

4. The method of claim 3, wherein the plurality of intercooler cores include a plurality of connection flanges to couple the plurality of intercooler cores together within the single-piece intercooler lid, and coupling includes coupling the plurality of intercooler cores together with the connection flanges and fasteners.

\* \* \* \* \*